United States Patent Office

Re. 23,916
Reissued Dec. 28, 1954

23,916

OXIDATION OF AROMATIC HYDROCARBONS

Eugene J. Lorand, Wilmington, Del., and John E. Reese, St. Simons Island, Ga., assignors to Hercules Powder Company, Wilmington, Del., a corporation of Delaware No Drawing. Original No. 2,664,447, dated December 29, 1953, Serial No. 31,394, June 5, 1948. Application for reissue February 16, 1954, Serial No. 410,748

15 Claims. (Cl. 260—610)

Matter enclosed in heavy brackets [ ] appears in the original patent but forms no part of this reissue specification; matter printed in italics indicates the additions made by reissue.

This invention relates to a process of oxidizing an alkyl-substituted aromatic organic compound having the structural formula

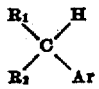

in which $R_1$ and $R_2$ represent alkyl groups and Ar represents an alkaryl group containing two or more carbon atoms in the alkyl side chain. More particularly, the invention relates to the oxidation of compounds such as diisopropylbenzene in the liquid phase by means of molecular oxygen.

Prior to the process of this invention the oxidation of compounds such as diisopropylbenzene was found to lead to the formation of products containing considerable amounts of ketones and alcohols. In the oxidation of p-diisopropylbenzene, for example, the oxidation led primarily to the formation of p-isopropyl acetophenone and α,α-dimethyl-p-isopropylbenzyl alcohol. There was no successful process for effecting the preparation of substantial yields of α,α-dimethyl-p-isopropylbenzyl hydroperoxide or of α,α,α′,α′-tetramethyl-p-xylylene dihydroperoxide from p-diisopropylbenzene.

Now in accordance with this invention it has been found that the preparation of tertiary hydroperoxides from alkyl-substituted aromatic organic compounds having the above structural formula may be carried out by passing an oxygen-containing gas through said compounds in the liquid phase at moderately elevated temperatures in the presence of low concentrations of a catalytically active heavy metal compound.

In carrying out the process of this invention manganese naphthenate, for example, is dissolved in p-diisopropylbenzene and the latter then is agitated vigorously while a stream of air or oxygen is simultaneously blown through the reaction mixture. The reaction is carried out at a temperature between about 40° and about 70° C. until standard analytical data such as refractive index indicate the conversion of approximately 30 to 70% of the p-diisopropylbenzene. Utilizing known techniques the reaction mixture then may be worked up to recover a reaction product containing preponderant amounts of α,α-dimethyl-p-isopropylbenzyl hydroperoxide. At the higher levels of conversion to hydroperoxide the reaction product also will contain a considerable amount of α,α,α′.α′-tetramethyl-p-xylylene dihydroperoxide, which crystallizes easily from the reaction mixture.

The following examples constitute specific illustrations of the process of this invention. All amounts are based on parts by weight.

EXAMPLE 1

Five hundred parts of commercial diisopropylbenzene (refractive index at 20° C., 1.4898) in which 2.5 parts of manganese naphthenate of 6% manganese content had been dissolved was placed in a closed reaction vessel equipped with a reflux condenser, a gas inlet tube opening through a porous fritted-glass plate, a thermometer, and an efficient high-speed agitator. The reaction vessel was immersed in a constant temperature bath maintained at 45° C. Through the inlet tube oxygen was introduced at a rate of 5 liters per hour per kilogram of diisopropylbenzene. The reaction was initiated by the addition of 28 parts of oxidized diisopropylbenzene from a previous run, this oxidized diisopropylbenzene containing 35.9% α,α-dimethyl - p - isopropylbenzyl hydroperoxide. Samples were taken at periodic intervals for refractive index and hydroperoxide determinations, the hydroperoxide content of the oxidized oil being determined by adding a sample of the oil to acidified potassium iodide and noting the amount of iodine liberated. At the end of 19 hours the oxidized oils had a refractive index of 1.4972 and contained 19.6% hydroperoxide. The refractive index indicated a conversion of approximately 40% of the diisopropylbenzene to oxidized materials. At the end of 43 hours the refractive index was 1.5005 (approximately 58% conversion) and the amount of α,α-dimethyl-p-isopropylbenzyl hydroperoxide was 34.6%.

EXAMPLE 2

The process of Example 1 was duplicated with the exception that the reaction was run for a much longer length of time and the temperature was raised to 50° C. at the end of 75 hours. At the end of 24 hours the refractive index of the oily reaction mixture was 1.4972, this indicating a conversion of about 40%, and the hydroperoxide content was 26.9%. At the end of 31 hours the hydroperoxide content was 29.3%. At the end of 48 hours the refractive index was 1.4986 and the hydroperoxide content was 31.8%. Upon completion of 49 hours of oxidation an additional 1.25 parts of manganese naphthenate was added to the reaction mixture. At the end of 55 hours the hydroperoxide content was 32.6%. Upon completion of 74 hours of oxidation the refractive index was 1.5002, this indicating a conversion of about 55%, and the hydroperoxide content was 36.4%. The temperature was raised to 50° C. upon completion of 75 hours of oxidation and the reaction continued at this temperature for an additional 24 hours. At this time the refractive index of the oily reaction mixture was 1.5012, this corresponding to a conversion of about 60%, and the amount of α,α-dimethyl-p-isopropylbenzyl hydroperoxide was 39.2%.

EXAMPLE 3

One hundred thirty-eight parts of p-ethylisopropylbenzene (refractive index at 20° C., 1.4932: boiling point at 67 mm./sq. cm. pressure, 115.4–115.8° C.) in which 0.7 part of manganese naphthenate of 6% manganese content had been dissolved was charged into a closed reaction vessel equipped with a reflux condenser, a gas inlet tube opening through a porous fritted-glass plate, a thermometer, and an efficient high-speed agitator. The reaction mixture was heated to 50° C. Through the inlet tube oxygen was introduced at a rate of 10 liters per hour per kilogram of p-ethylisopropylbenzene. The reaction was intiated by the addition of 7.16 parts of oxidized cumene, this oxidized cumene containing 58.2% α,α-dimethylbenzyl hydroperoxide. The color of the reaction mixture turned deep brown and an exothermic reaction took place. Heating was stopped and the reaction mixture cooled to remove the excess reaction heat. At the end of 18 hours the color of the reaction mixture turned to light amber, the refractive index was 1.4995, and the hydroperoxide content 10.2%. An additional amount of manganese naphthenate (0.7 part) then was added to the reaction mixture and the oxidation continued for an additional 48 hours, the temperature being maintained between 50° and 60° C. At the end of this time the reaction mixture had a refractive index of 1.5028 and contained 18.8% α,α-dimethyl-p-ethylbenzyl hydroperoxide.

EXAMPLE 4

Five thousand parts of commercial diisopropylbenzene (refractive index at 20° C., 1.4899) in which 15.6 parts of lead naphthenate of 32% lead content had been dissolved was placed in a nickel autoclave equipped with a reflux condenser, a stirrer (200 R. P. M.) and designed for high-pressure oxidations. The autoclave also was charged with 207 parts of oxidized cumene to initiate the reaction, this oxidzed cumene containing 72.2% α,α-dimethylbenzyl hydroperoxide. Oxygen was passed through the reaction mixture at a rate of 0.0276 cubic feet per minute per kilogram of diisopropylbenzene for four hours. During the oxidation the temperature within the autoclave was maintained at 120° C. and the pressure of 60 pounds per square inch. Upon completion of the oxidation there was obtained 5440 parts of crude reaction product. The refractive index of the crude product was 1.4961, this indicating a conversion of 32.6% of the diisopropylbenzene to oxidized materials. Analysis of the reaction product showed the presence of 23.3% α,α-dimethyl-p-isopropylbenzyl hydroperoxide.

The examples have set forth the use of diisopropylbenzene and p-ethylisopropylbenzene as the compounds to which the oxidation has been applied, but other compounds having the structural formula previously set forth for the alkyl-substituted aromatic organic compounds may be utilized. Exemplary of such are triisopropylbenzene and p-butylisopropylbenzene. The main requirement for the compounds which may be oxidized in accordance with this invention is the presence of a tertiary carbon atom carrying a hydrogen atom as its fourth substituent. As shown by the structural formula the carbon atom is tertiary because it is directly connected to three other carbon atoms contained in the groups represented by $R_1$, $R_2$ and Ar. The alkaryl group need not be derived from benzene as is the case in diisopropylbenzene. Compounds containing aromatic nuclei such as those derived from naphthalene, anthracene and phenanthrene also are operable, but some of these compounds, being solids, must be dissolved in a suitable solvent, such as benzene, during the liquid phase oxidation. The alkaryl group essentially is an aromatic nucleus substituted with one or more alkyl groups containing two or more carbon atoms. Representative alkyl groups composing the alkyl side chain portion of the alkaryl group may be illustrated by the ethyl group in p-ethylisopropylbenzene, the isopropyl group in p-diisopropylbenzene and the two isopropyl groups in triisopropylbenzene and the groups may, for example, be ethyl, propyl, isopropyl, butyl, isobutyl, secondary butyl, tertiary butyl, and the like. Those compounds containing alkaryl groups in which the alkyl substituent contains, directly attached to the aromatic nucleus, a tertiary carbon atom carrying a hydrogen atom as its fourth substituent, are capable of being oxidized to dihydroperoxides. Illustrative of such compounds is diisopropylbenzene, which may be oxidized to α,α,α′,α′-tetramethyl-p-xylylene dihydroperoxide. Similarly, compounds containing two tertiary alkyl substituents in the alkaryl group may be oxidized to trihydroperoxides. Exemplary of such compounds is triisopropylbenezene. The alkyl substituents in the alkaryl groups may, in other words, have the same configuration as the tertiary alkyl group

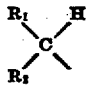

in the structural formula shown previously. The alkyl groups as represented by $R_1$ and $R_2$ in the structural formula need not be limited to the methyl groups of p-ethylisopropylbenzene and diisopropylbenzene. Other alkyl groups such as those previously indicated as suitable in composing the alkyl substituents of the alkaryl groups may be utilized, and $R_1$ and $R_2$ may be either the same or different.

The examples have set forth the use of molecular oxygen as the oxygen-containing gas but air also may be used. The oxygen may be furnished also in mixtures of oxygen with nitrogen or other inert gases. Oxygen, when used alone, may be in the form of pure or commercial oxygen. Air may be utilized either as it is readily available or as humidified up to the saturation point. Furthermore, it is advisable to wash the air with a caustic solution in order to remove carbon dioxide. The rate of input of the oxygen-containing gas may vary within a wide range, depending upon the concentration of oxygen in the gas, the activity of the catalyst, the pressure at which the oxidation is carried out, and the efficiency of dispersion. In general, at atmospheric pressure the rate of input will vary from about one liter to about 100 liters per hour per kilogram of the alkyl-substituted aromatic organic compound, a perferable range on this basis being from about 5 to about 25 liters per hour per kilogram. At superatmospheric pressures, for example, 50 to 200 pounds per square inch, the rate of input may be from about 50 to about 350 liters per hour per kilogram of the alkaryl compound, a preferable range being from about 50 to about 280 liters per hour per kilogram.

The oxidation process of this invention is carried out in the presence of a catalytically active heavy metal compound, particularly of such metals as manganese, cobalt, lead, iron, nickel, copper, vanadium, chromium and mercury. The oxides, hydroxides, or organic acid salts of any of these metals or combinations thereof which are soluble in the alkyl-substituted aromatic organic compound or solution thereof in a suitable solvent may be employed. The heavy metal salts of organic acids are particularly useful as catalysts in accordance with this invention. Exemplary of such salts are manganese-butyl phthalate, manganese linoleate, manganese naphthenate, a mixture of manganese and lead acetates, cobalt linoleate, cobalt naphthenate, mixed lead-cobalt naphthenate, and the heavy metal resinates, such as manganese, lead or cobalt resinate. The resinates may be derived from any rosin acid, such as abietic, pimaric, dehydroabietic, dihydroabietic or tetrahydroabietic acid. Those oxidized oils obtained according to the process of this invention and containing preponderant amounts of hydroperoxides are useful in initiating the oxidation reaction by relieving inhibitions caused by harmful impurities. These oxidized oils, however, do not act as actual catalysts and are therefore highly desirable initiators for those oxidations which exhibit inhibition.

The concentration of the catalytically active heavy metal compound is critical in obtaining high hydroperoxide yields. If the concentration of the catalyst is too low, the reaction is too slow and if the catalyst concentration is higher than the maximum value utilized in accordance with this invention, the yield of hydroperoxide wil be adversely affected. In general, high hydroperoxide yields may be obtained if the concentration of the catalyst in solution in the oxidation reaction mixture is at any particular instant from about 0.15 to about 0.8% based on the alkyl-substituted aromatic organic compound. A preferable range on this basis is from about 0.2 to about 0.6%, and a particularly applicable range is from about 0.25 to about 0.5%. Since many of the heavy metals have a tendency to precipitate as peroxides, such as manganese dioxide, from, for example, their salts with organic acids, it may be necessary from time to time to add an additional amount of the catalyst in order to maintain the desired catalyst concentration. Within the ranges of catalyst concentration, the amount of any particular catalyst will vary somewhat depending upon the metal content and activity of the catalyst. It is possible, for example, in the preparation of the heavy metal salts of organic acids to vary the amount of metal contained in the final salt, consequently smaller amounts of a salt containing a relatively high metal content will be needed in comparison to the same salt containing a smaller amount of the metal. Similarly the cobalt salts are more active than the manganese and lead salts, and the naphthenates are more active than the linoleates, which in turn are more active than the acetates. Consequently, a smaller amount of cobalt naphthalene, for example, will be needed than will be needed in the case of lead naphthenate or manganese linoleate. Relative to the hydroperoxide-rich oils which may be used to initiate the oxidation reaction, these oils may be used in amounts varying from about 1 to about 50% based on the alkyl-substituted aromatic organic compound, but a preferable range is from about 2 to about 20%.

The temperatures at which the oxidations are carried out also are quite critical in obtaining optimum yields of hydroperoxides. The temperatures which actually may be used, however, will depend on the pressure existing during the oxidations. Upon the basis of atmospheric pressure, the temperature should be in the range of about 40° to about 70° C., a more desirable range being between about 45° and about 65° C., and a particularly advantageous range being between about 50° and about 60° C. The minimum temperature of 40° C. is necessary since the process of this invention utilizes low catalyst concentrations and the rate of reaction at, for example, room temperature, is too slow to be of commercial significance. On the other hand, if the temperature during oxidation is too high, the reaction occurs in such a manner as to result in excessive ketone formation. In the case of p-diisopropyl-benzene, for example, oxidation at high temperatures at atmospheric pressure will result in the formation of considerable amounts of p-isopropylacetophenone, consequently the maximum temperature which should be used at atmospheric pressure in order to obtain high yields of hydroperoxides and minimize ketone formation is 70° C.

Temperatures greater than 70° C. may be used, however, in the process of this invention providing the pressure is increased to greater than atmospheric. Although elevation of the temperature during the oxidation to greater than 70° C. will cause increased decomposition of the hydroperoxides to ketones, this is offset by the increased rate of hydroperoxide formation caused by the elevation of the pressure. Also, it is possible to hinder the decomposition of the hydroperoxides to ketones, as caused by elevation of the temperature, by using a low activity catalyst such as lead naphthenate or linoleate, and by maintaining the catalyst concentration at a low level within the broad ranges of 0.15 to 0.8%. A catalyst concentration between about 0.15 and about 0.3% generally is satisfactory. In other words, by proper selection of pressure, catalyst and catalyst concentration, temperatures above 70° C. may be used during the oxidation to obtain in shorter lengths of time oxidation reaction products having hydroperoxide and ketone contents as desirable as those reaction products obtained at a temperature of 70° C. or less. The amount of ketone will not be out of proportion to the amount of hydroperoxide. Using pressures greater than atmospheric the process of this invention therefore may be carried out at temperatures between about 40° and about 140° C., a more desirable range being between about 45° and about 130° C., and a particularly advantageous range between about 50° and about 120° C.

The pressures which can be utilized during those oxidations carried out at greater than atmospheric pressure are limited only by equipment design. From a practical standpoint pressures from atmospheric up to about 500 pounds per square inch are feasible. A preferable range is from about 50 to about 200 pounds per square inch.

Since the reaction is heterogeneous, suitable agitation is necessary. It is particularly important to bring the air, oxygen, or other oxygen-containing gas into intimate contact with the liquid phase, and this may be effected by using high-speed stirrers, suitable nozzles, porous plates or their combinations.

The course of the reaction may be followed by taking samples at intervals and determining the refractive index of the oily material. In the oxidation of diisopropylbenzene, for example, refractive index values between about 1.4955 and about 1.5030 indicate that about 30 to about 70% of the original organic material has been oxidized, and the reaction then is advisably interrupted. Conversions from about 30 to about 70% can easily be obtained in the process of this invention and it is desirable in obtaining high hydroperoxide yields to carry the conversion up to about 50–70%, since it generally is not until this conversion value is exceeded that undue amounts of secondary products such as the corresponding alcohol or ketone are formed.

The method utilized in recovery of the reaction products will vary depending upon the use to which the hydroperoxide is to be put. If the use of the hydroperoxide does not require separation of the hydroperoxide from other components, such as alcohols, ketones and unreacted starting material which may be present in the crude reaction mixture, the oily reaction product may be filtered through a layer of some filter aid to remove the catalyst by adsorption, then washed with dilute aqueous alkali and used either in the wet, slightly cloudy state for various purposes or after clarification and drying by filtration. The dilute aqueous alkali used in the washing step may be sodium hydroxide, sodium carbonate, sodium bicarbonate, and the like, the concentration of these alkalies in aqueous solution ranging from about 1 to about 10%, but preferably from about 2 to about 5%. If it is desired, however, to obtain a highly concentrated hydroperoxide, the crude reaction product, after the alkali wash, may be stripped of unreacted hydrocarbon by distillation at pressures of about 1 to about 10 millimeters of mercury per square centimeter. The hydroperoxides themselves may be safely distilled at temperatures below about 100° C., this requiring the use, however, of pressures of about 0.01 to about 1.0 millimeter. Another method of separating the hydroperoxides from the crude oily reaction product involves precipitation of the hydroperoxide with a concentrated aqueous solution (25 to 40%) of sodium hydroxide. The precipitate is crystalline and on the basis of analysis is a compound of the hydroperoxide with sodium hydroxide and water.

The oxidation according to this invention apparently proceeds by a peroxide mechanism. Using p-diisopropylbenzene as an example, when this compound is oxidized with molecular oxygen, a hydroperoxide is formed on the tertiary carbon atom of one of the isopropyl groups. In the presence of the small amount of catalyst utilized in accordance with this invention, a very small fraction of the hydroperoxide is decomposed, resulting in the formation of free radicals which are sufficient to initiate the formation of more hydroperoxide molecules. If the concentration of the catalyst exceeds the amount specified in accordance with this invention, increasing amounts of hydroperoxide will decompose, resulting in an acceleration of the over-all oxidation, but decreasing the amount of undecomposed hydroperoxide at the expense of the formation of secondary products such as alcohols and ketones. That the oxidation follows a chain mechanism is shown by the existence of an induction period, by cases of inhibition, and by the fact that both may be eliminated by the addition of hydroperoxide-rich oils from a previous oxidation run.

The process of this invention is advantageous in that it has been found possible by proper selection of catalyst concentration and temperature to obtain aryl(dialkyl)-methyl hydroperoxides. These hydroperoxides are highly useful and find various commercial applications. They are excellent catalysts for the polymerization of vinyl, vinylidene, and vinylene compounds, being, for example, highly useful in the copolymerization of butadiene and styrene to form synthetic rubber, and they also are useful in rubber reclaiming, in flotation, and in kier boiling, bleaching and other textile operations.

What we claim and desire to protect by Letters Patent is:

1. The process of preparing a substantial yield of a tertiary hydroperoxide which comprises passing an oxygen-containing gas through an alkyl-substituted aromatic organic compound having the structural formula

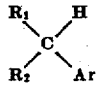

in liquid phase in the presence of a catalyst of the group consisting of heavy metal oxides, hydroxides, organic acid salts and mixtures thereof, the concentration of the catalyst in solution in the oxidation reaction mixture being from about 0.15 to about 0.8%, based on the alkyl-substituted aromatic compound, and in the structural formula $R_1$ and $R_2$ representing alkyl groups and Ar representing an alkaryl group containing two or more carbon atoms in the alkyl side chain.

2. The process of preparing a substantial yield of a tertiary hydroperoxide which comprises passing an oxygen-containing gas through an alkyl-substituted aromatic organic compound having the structural formula

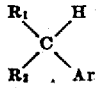

in liquid phase in the presence of a heavy metal salt of an organic acid, the concentration of the heavy metal salt in solution in the oxidation reaction mixture being from about 0.15 to about 0.8%, based on the alkyl-substituted aromatic compound, and in the structural formula $R_1$ and $R_2$ representing alkyl groups and Ar representing an alkaryl group containing two or more carbon atoms in the alkyl side chain.

3. The process of preparing a substantial yield of a tertiary hydroperoxide which comprises passing an oxygen-containing gas through an alkyl-substituted aromatic organic compound having the structural formula

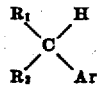

in liquid phase in the presence of a heavy metal salt of an organic acid, the concentration of the heavy metal salt in solution in the oxidation reaction mixture being from about 0.2 to about 0.6%, based on the alkyl-substituted aromatic compound, and in the structural formula $R_1$ and $R_2$ representing alkyl groups and Ar representing an alkaryl group containing two or more carbon atoms in the alkyl side chain.

4. The process of preparing a substantial yield of a tertiary hydroperoxide which comprises passing an oxygen-containing gas through an alkyl-substituted aromatic organic compound having the structural formula

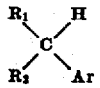

in liquid phase in the presence of a heavy metal salt of an organic acid, the concentration of the heavy metal salt in solution in the oxidation reaction mixture being from about 0.25 to about 0.5%, based on the alkyl-substituted aromatic compound, and in the structural formula $R_1$ and $R_2$ representing alkyl groups and Ar representing an alkaryl group containing two or more carbon atoms in the alkyl side chain.

5. The process of preparing a substantial yield of a tertiary hydroperoxide which comprises passing an oxygen-containing gas through an alkyl-substituted aromatic compound having the structural formula

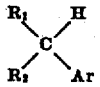

in liquid phase in the presence of a manganese salt of an organic acid, the concentration of the manganese salt in solution in the oxidation reaction mixture being from about 0.15 to about 0.8%, based on the alkyl-substituted aromatic compound, and in the structural formula $R_1$ and $R_2$ representing alkyl groups and Ar representing an alkaryl group containing two or more carbon atoms in the alkyl side chain.

6. The process of preparing a substantial yield of a tertiary hydroperoxide which comprises passing an oxygen-containing gas through an alkyl-substituted aromatic organic compound having the structural formula

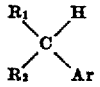

in liquid phase in the presence of manganese naphthenate, the concentration of the manganese naphthenate in solution in the oxidation reaction mixture being from about 0.15 to about 0.8%, based on the alkyl-substituted aromatic compound, and in the structural formula $R_1$ and $R_2$ representing alkyl groups and Ar representing an alkaryl group containing two or more carbon atoms in the alkyl side chain.

7. The process of preparing a substantial yield of a tertiary hydroperoxide which comprises passing oxygen through an alkyl-substituted aromatic organic compound having the structural formula

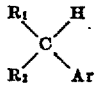

in liquid phase in the presence of a heavy metal salt of an organic acid, the concentration of the heavy metal salt in solution in the oxidation reaction mixture being from about 0.15 to about 0.8%, based on the alkyl-substituted aromatic compound, and in the structural formula $R_1$ and $R_2$ representing alkyl groups and Ar representing an alkaryl group containing two or more carbon atoms in the alkyl side chain.

8. The process of preparing a substantial yield of α,α-dimethyl-p-isopropylbenzyl hydroperoxide which comprises passing an oxygen-containing gas through p-diisopropylbenzene in the liquid phase in the presence of a heavy metal salt of an organic acid, the concentration of the heavy metal salt in solution in the oxidation reaction mixture being from about 0.15 to about 0.8%, based on the p-diisopropylbenzene.

9. The process of preparing a substantial yield of α,α-dimethyl-p-isopropylbenzyl hydroperoxide which comprises passing oxygen through p-diisopropylbenzene in the liquid phase in the presence of manganese naphthenate, the concentration of the manganese naphthenate in solution in the oxidation reaction mixture being from about 0.15 to about 0.8%, based on the p-diisopropylbenzene.

10. The process of preparing a substantial yield of α,α-dimethyl-p-ethylbenzyl hydroperoxide which comprises passing an oxygen-containing gas through p-ethylisopropylbenzene in the liquid phase in the presence of a heavy metal salt of an organic acid, the concentration of the heavy metal salt in solution in the oxidation reaction mixture being from about 0.15 to about 0.8%, based on the p-ethylisopropylbenzene.

11. The process of preparing a substantial yield of α,α-dimethyl-p-ethylbenzyl hydroperoxide which comprises passing oxygen through p-ethylisopropylbenzene in the liquid phase in the presence of cobalt linoleate, the concentration of the cobalt linoleate in solution in the oxidation reaction mixture being from about 0.15 to about 0.8%, based on the p-ethylisopropylbenzene.

12. The process of preparing a substantial yield of α,α,α′,α′-tetramethyl-p-xylylene dihydroperoxide which comprises passing an oxygen-containing gas through p-diisopropylbenzene in the liquid phase in the presence of a heavy metal salt of an organic acid, the concentration, of the heavy metal salt in solution in the oxidation reaction mixture being from about 0.15 to about 0.8% based on the p-diisopropylbenzene.

13. The process of preparing a substantial yield of p-butylisopropylbenzene hydroperoxide which comprises passing an oxygen-containing gas through p-butylisopropylbenzene in the liquid phase in the presence of a heavy metal salt of an organic acid, the concentration of the heavy metal salt in solution in the oxidation reaction mixture being from about 0.15 to about 0.8% based on the p-butylisopropylbenzene.

14. The process of preparing a substantial yield of triisopropylbenzene trihydroperoxide which comprises passing an oxygen-containing gas through triisopropylbenzene in the liquid phase in the presence of a heavy metal salt of an organic acid, the concentration of the heavy metal salt in the solution in the oxidation reaction mixture being from about 0.15 to about 0.8% based on the triisopropylbenzene.

*15. As a new product, triisopropylbenzene trihydroperoxide.*

References Cited in the file of this patent or the original patent

UNITED STATES PATENTS

| Number | Name | Date |
|---|---|---|
| 2,302,466 | Palmer et al. | Nov. 17, 1942 |
| 2,403,771 | Vaughn et al. | July 9, 1946 |
| 2,430,864 | Farkas et al. | Nov. 18, 1947 |
| 2,434,888 | Rust et al. | Jan. 20, 1948 |
| 2,548,435 | Lorand et al. | Apr. 10, 1951 |

FOREIGN PATENTS

| Number | Country | Date |
|---|---|---|
| 99,523 | Switzerland | June 1, 1923 |
| 784,016 | France | Apr. 15, 1935 |

OTHER REFERENCES

Hock et al., Ber., vol 77, pp. 257 to 264 (1944).